United States Patent [19]
Litchford

[11] 3,895,382
[45] July 15, 1975

[54] METHOD AND APPARATUS FOR MEASURING PASSIVELY RANGE AND BEARING

[75] Inventor: George B. Litchford, Northport, N.Y.

[73] Assignee: Litchstreet Co., Northport, N.Y.

[22] Filed: Jan. 31, 1974

[21] Appl. No.: 438,297

[52] U.S. Cl. .................. 343/6.5 LC; 343/112 CA
[51] Int. Cl. .......................... G01s 5/02; G01s 9/02
[58] Field of Search ...... 343/6.5 R, 6.5 LC, 112 CA

[56] References Cited
UNITED STATES PATENTS

| | | | |
|---|---|---|---|
| 3,167,772 | 1/1965 | Bagnall, Jr. et al. | 343/6.5 LC X |
| 3,312,971 | 4/1967 | Gehman | 343/6.5 LC |
| 3,336,591 | 8/1967 | Michnik et al. | 343/6.5 LC |
| 3,412,399 | 11/1968 | Chisholm | 343/6.5 LC |
| 3,550,129 | 12/1970 | Steele | 343/112 CA |
| 3,566,404 | 2/1971 | Sorkin | 343/6.5 R |
| 3,626,411 | 12/1971 | Litchford | 343/6.5 X |

Primary Examiner—Malcolm F. Hubler
Attorney, Agent, or Firm—Brumbaugh, Graves, Donohue & Raymond

[57] ABSTRACT

In an aircraft collision avoidance system, a method and apparatus for determining passively the slant range and bearing angle to another transponder equipped aircraft within a selectable proximity to an aircraft (own aircraft) equipped with the collision avoidance system in which the azimuthal lines of position from interrogating standard secondary surveillance radar ground stations to both aircraft and the times of arrival at the own aircraft of the transponder replies of the other aircraft are determined. From such data, the bearing angles to the actual and imaginary locations of the transponder equipped aircraft are calculated and then supplied to a truth table which identifies the bearing angle to the actual location of the transponder equipped aircraft. The slant range to the transponder equipped aircraft is then computed in accordance with a predetermined relationship between the time of arrival of one of the transponder replies and the bearing angle.

19 Claims, 12 Drawing Figures

METHOD AND APPARATUS FOR MEASURING PASSIVELY RANGE AND BEARING

CROSS-REFERENCE TO RELATED PATENTS AND APPLICATIONS

This application is related to the following United States patents and patent applications:
1. U.S. Pat. No. 3,626,411 of George B. Litchford, issued Dec. 7, 1971.
2. U.S. Pat. No. 3,735,408 of George B. Litchford, issued May 22, 1973.
3. U.S. Pat. No. 3,757,324 of George B. Litchford, issued Sept. 4, 1973.
4. U.S. Pat. Application Ser. No. 317,810 of George B. Litchford, filed Dec. 22, 1972.
5. U.S. Pat. Application Ser. No. 345,432 of George B. Litchford, filed Mar. 27, 1973.
6. U.S. Pat. Application Ser. No. 371,839 of George B. Litchford, filed June 20, 1973.
7. U.S. Pat. Application Ser. No. 371,883 of George B. Litchford, filed June 20, 1973.

BACKGROUND OF THE INVENTION

The present invention pertains to radiolocation of mobile vehicles within the coverage of at least two scanning radars of a standard secondary radar system.

More particularly, the invention concerns a collision avoidance/proximity warning system, capable of determining the slant range and relative bearing to a nearby mobile vehicle, that is based on signals emitted by secondary radars, such as the National Air Traffic Control Radar Beacon System (ATCRBS) and the International Civil Aviation Organization (ICAO) Secondary Surveillance Radar System.

Major airports and way points are presently equipped with secondary surveillance radar (SSR) adapted to cooperate with transponders carried on aircraft to discriminate against interference and ground clutter and to provide for automatic transmission of identification and other data, such as altitude, from the aircraft to the ground-based radar. A traffic controller observing the radar display directs the pilots of the involved aircraft by radio, usually with voice communication, so as to maintain or restore safe separations between aircraft. Such a system of traffic control and separation assurance is limited in capability because each aircraft must be dealt with individually and requires its share of the controller's time and attention and its share of the available radio spectrum. When traffic is heavy, take-offs and landings are delayed, and the possibility of collision increases.

The potential for disastrous mid-air collisions has become so pronounced that numerous inter-aircraft cooperative proximity warning systems have been proposed. Those more prominently under study or development at this time involve frequent or quasi-continuous exchange of signals between all cooperative aircraft within the region of interest and make no provision for non-cooperating aircraft. The required airborne equipment would be bulky and expensive, use more of the already crowded radio spectrum and would be generally independent of other needed and existing equipment, such as transponders. Another drawback of some of the proposed systems is that they provide only relative positional information, without ground reference but in effect with respect to a randomly floating reference.

Nearly all the disadvantages of these proposed systems may be overcome by providing aircraft with a collision avoidance system based on the already existing secondary surveillance radar system. Particularly if the identity, altitude, range, and bearing of all aircraft in the proximity of one's own aircraft can be obtained entirely passively — i.e., by merely "listening" to the ground signals and transponder replies of nearby aircraft to interrogations of radar ground stations — it will be possible to provide an effective warning in time to avoid collisions without major outlay for an entirely new system and without utilizing an additional portion of the radio spectrum.

The need for such a system has been recognized in Congress, as illustrated by the proposed legislation H.R. 9758 recently introduced in the House. This legislation provides as follows:

AMENDMENTS TO THE FEDERAL AVIATION ACT OF 1958

Sec. 4a. Section 101 of the Federal Aviation Act of 1958 is amended by inserting at the end thereof the following:

(37) "Collision avoidance system" means an all weather cooperative system on an aircraft which is compatible with but independent of ground-based air traffic control systems and can detect all other aircraft representing a potential collision threat and, if necessary, indicate to the pilot a safe evasion maneuver.' b. Section 601, of the Federal Aviation Act of 1958 is amended by adding at the end thereof the following new subsection:

'COLLISION AVOIDANCE SYSTEMS'

'd. (1). Minimum standards pursuant to this section shall include the requiremment that within a reasonable time after its enactment—
' (A) a collision avoidance system shall be installed on any aircraft which is operated by an air carrier or a supplemental air carrier, and has a maximum certificated takeoff weight in excess of sixty thousand pounds;
' (B) a collision avoidance system shall be installed on all public aircraft;
' (C) a collision avoidance system shall be installed on any civil aircraft which has a maximum certificated gross weight in excess of twelve thousand five hundred pounds;
' (D) a collision avoidance system incorporated into a transponder, and which produces only a signal to other aircraft, shall be installed on all civil aircraft not covered by clauses (A) and (C) above.

'(2) Specialized sport, experimental, agricultural aircraft, gliders, and aircraft operating outside national airspace, as defined by the Administrator, shall be excepted from the provisions of this subsection when operating outside congested terminal airspace.'

As used herein and as conventionally understood, bearing angle is meant to define the angle from the collision avoidance system equipped aircraft (own aircraft) and azimuth angle is meant to define the angle from the ground SSR, to either the own aircraft or the other aircraft.

SUMMARY OF THE INVENTION

It is therefore an object of the present invention to provide apparatus for determining passively the range and bearing angle to another mobile vehicle within a selectable proximity to one's own position from interrogation replies of the other vehicle's transponder in a secondary radar system.

It is also an object of the present invention to provide such apparatus for determining passively the altitude, range and bearing to a mobile vehicle possessed merely of a transponder from the replies of such transponder and the azimuthal or radial lines of position to such a transponder from the dispersed ground stations of the radar system.

These and other objects of the present invention are accomplished by a collision avoidance system installed in an own aircraft which includes line of position circuitry for determining the azimuthal lines of position to the own aircraft and to another aircraft from interrogating ground stations and which includes time of arrival circuitry for determining the times of arrival at the own aircraft of the transponder replies by the other aircraft to the interrogating signals emitted by the ground stations and received by both aircraft.

From such data, the system calculates the bearing angles to the actual and imaginary locations of the other aircraft. The signals representative of the bearing angles to such actual and imaginary locations of the other aircraft are supplied to truth table circuitry wherein a decision is made as to which signal represents the bearing angle to the actual location of the other aircraft and wherein the signal representative of the bearing angle to the imaginary location is eliminated. The slant range is then computed from a predetermined relationship between the time of arrival of a reply from a selected one of the ground stations and the associated bearing angle.

In a preferred embodiment of the invention for an environment where two ground stations interrogate the own aircraft and the other aircraft, the bearing angles to the two possible locations of such other aircraft are computed in accordance with the following equations:

$$\theta_1 = 2 \tan^{-1} \left[ -\cot \frac{\Delta x}{2} + \frac{\sqrt{T_2/T_1}}{\sin \frac{\Delta x}{2}} \right]$$

$$\theta_2 = 2 \tan^{-1} \left[ -\cot \frac{\Delta x}{2} - \frac{\sqrt{T_2/T_1}}{\sin \frac{\Delta x}{2}} \right]$$

where $\theta_1$ and $\theta_2$ are the two possible bearing angles, $\Delta x$ is the angular difference between the two azimuthal lines of position to the aircraft, and $T_1$ and $T_2$ are the times of arrival of the replies from the other aircraft to the interrogating signals of the two ground stations.

In a preferred embodiment of the invention for a three or more ground station environment, the bearing angles to at least four possible locations of such other aircraft are computed in accordance with the foregoing equations. In such case, the parameters $\Delta x$, $T_1$ and $T_2$ will vary in accordance with the identity of the ground stations interrogating the aircraft.

For a two ground station environment, the timing sequences of the associated interrogation and reply signals are compared in lead/lag circuitry to develop signals, against which the signs of the calculated bearing angle signals are compared in the truth table to determine which of the computed bearing angles represents the bearing angle to the actual location of the other aircraft. For a three or more ground station environment, the truth table comprises circuitry for comparing the multiple bearing angles as measured from a selected azimuthal line of position to determine coincidence therebetween. Such coincidence permits the selection of the bearing angle to the actual location of the other aircraft.

Once the bearing angle is known, the slant range to the other aircraft is calculated according to the following equation:

$$R = \frac{T_1}{1 + \cos \theta}$$

In a two SSR ground station environment, the bearing angles to the two possible locations of such other aircraft may also be computed in accordance with the following equations:

$$\theta_1 = 2 \tan^{-1} \frac{C + \sqrt{C^2 + D^2 - \left( \frac{1}{T_1} - \frac{1}{T_2} \right)^2}}{D - \left( \frac{1}{T_1} - \frac{1}{T_2} \right)}$$

$$\theta_2 = 2 \tan^{-1} \frac{C - \sqrt{C^2 + D^2 - \left( \frac{1}{T_1} - \frac{1}{T_2} \right)^2}}{D - \left( \frac{1}{T_1} - \frac{1}{T_2} \right)}$$

where $\alpha$ is one-half the sum of the azimuth angles ($\alpha_o$, $\alpha_1$) from the first SSR ground station to the own aircraft and the other aircraft, $\beta$ is one-half the sum of the azimuth angles ($\beta_o$, $\beta_1$) from the second SSR ground station to the own aircraft and the other aircraft, $$A = \frac{1}{T_1 \cos \frac{(\alpha_1 - \alpha_o)}{2}}$$

$$B = \frac{1}{T_2 \cos \frac{(\beta_1 - \beta_o)}{2}}$$

$T_1$ and $T_2$ are the times of arrival,
$C = A \sin \alpha - B \sin \beta$ and $D = A \cos \alpha - B \cos \beta$.

The correct bearing angle, $\theta_1$ or $\theta_2$, is then detected by a truth table. With the correct bearing angle known, the slant range is calculated according to the following equation:

$$R = \frac{1}{\left[ \frac{1}{T_1} + A \cos (\theta - \alpha) \right]} \text{ or}$$

$$R = \frac{1}{\left[ \frac{1}{T_2} + B \cos (\theta - \beta) \right]}$$

DESCRIPTION OF THE PREFERRED EMBODIMENTS

In the standard ICAO secondary surveillance radar system, an SSR ground station repeatedly transmits interrogations at a frequency of 1030 MHz on a continuously rotating beam. The beam, which is conventionally controlled by the strength of side lobe suppression signals to a width of 4°, scans the surrounding area in the clockwise direction, completing one revolution in a period of approximately 4 to 10 seconds. In the United States, the SSR ground stations are installed in a random pattern across the country, the density of which generally varies in accordance with the density of air traffic.

All commercial transport aircraft and nearly all other aircraft that utilize major airports are equipped with transponders which reply to interrogations received from SSR ground stations. As each SSR beam scans past an aircraft, it interrogates that aircraft transponder from about 15 to 25 times at precise intervals which are indigenous to each station, e.g., 2 to 5 msec. Each interrogation initiates a reply transmission from the transponder at a frequency of 1090 MHz.

The transponder reply message includes two so-called "framing pulses" which are spaced apart in time by 20.3 microseconds. The interval between the framing pulses contains a number of discrete sub-intervals, in each of which a pulse may or may not be transmitted, depending upon what information is to be contained in the reply. Twelve such sub-intervals are available, permitting 4,096 different binary code groups, each representing one or more pieces of information such as identity, barometric altitude, distress signal, and so on. The desired reply code group, now internationally standardized, may be set into the transponder by the operator of the aircraft using manual code wheel switches, or in some cases automatically by an altimeter or even semi-autommatically, for example by pressing a button.

Conventionally, each aircraft transponder is interrogated by each ground station to alternately transmit the identity (A mode) and the altitude (C mode) of its aircraft. The replies to these alternate interrogations can be decoded at the SSR ground station and utilized to place both identity and altitude on the radar display of the ground controller adjacent the spot which represents the aircraft that is transmitting the replies. A common radio channel allows the airborne transponder to reply to all ground interrogators within line of sight.

The first framing pulse ($F_1$) of the reply of a transponder follows the end of a received interrogation by a standard delay of 3 $\mu$sec. The second framing pulse ($F_2$) is transmitted 20.3 $\mu$sec after the first framing pulse. The transponder is then automatically disabled for an interval of about 45 to 125 $\mu$sec, called the "dead time".

Unlike other proposed collision avoidance systems, the system of the present invention is fully compatible with the present United States and ICAO secondary surveillance radar system and utilizes the 1030 MHz interrogations and the 1090 MHz replies thereto to determine passively the bearing angle and slant range between closely spaced aircraft. Moreover, the present system meets the requirements of the foregoing proposed legislation which would mandate that a collision avoidance system be installed on all air carriers, all public aircraft and large civil aircraft, and that such systems be designed to respond to signals automatically generated by the transponder in any small civil aircraft not required by the legislation to have a collision avoidance system.

Figure 1A:
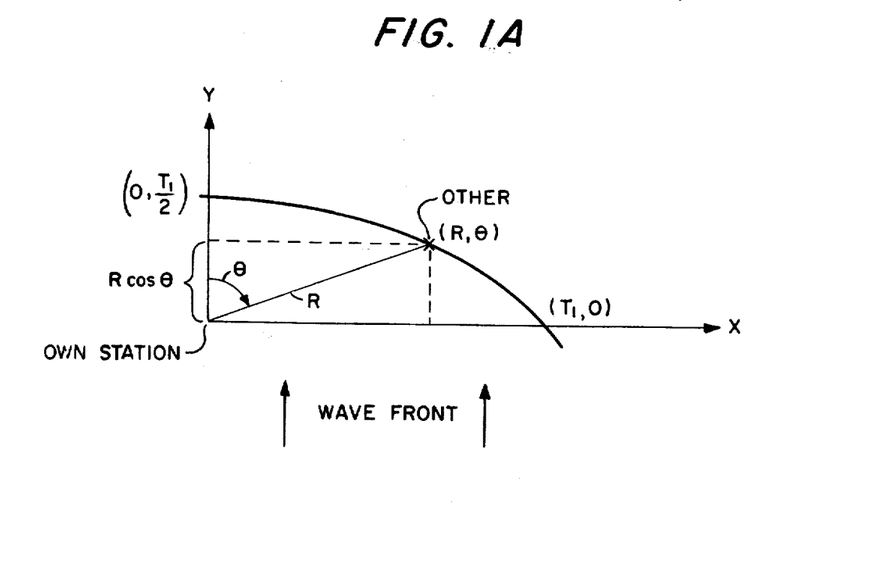
FIGS. 1A, 1B, 1C and 1D are geometrical diagrams useful in understanding the derivation of bearing angles in accordance with the present invention.
Figure 1B:
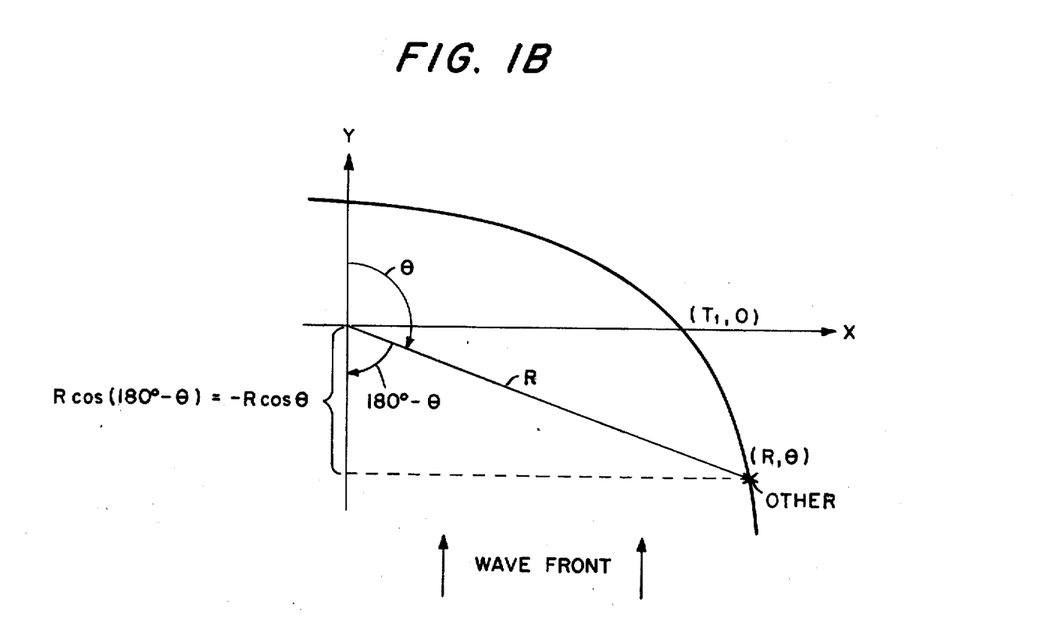
Figure 1C:
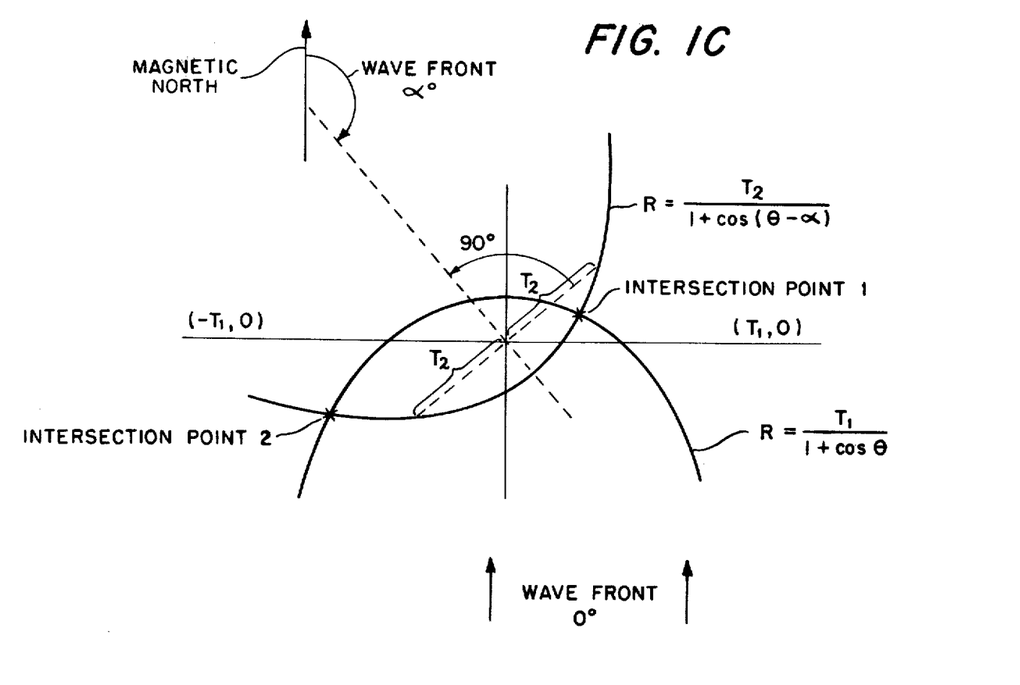

A discussion first of FIGS. 1A, 1B 1C and the mathematical basis for passive range measurements is useful to an understanding of the present invention. Referring thus to FIG. 1, the own station is shown at the origin, while a single wavefront is shown travelling in the $y$ direction from a very distant radar. The front reaches simultaneously the own station and another possible station $T_1$ units to the right of the own station. At this instant, a signal is initiated from the other station and travels to the own station, arriving at a time $\Delta t$ later. The difference between the time of arrival (TOA) of the wavefront and the time of arrival of other station's signal corresponds to the distance $T_1$.

In order to determine the locus of all points having the same TOA difference ($T_1$), FIG. 1A illustrates the case when the radar wavefront arrives at the own station first. The point(O, $T_1/2$) on the $y$ axis typically satisfies this condition.

Considering then a point (R, $\theta$) for the other station as indicated, the front must travel a distance R cos $\theta$ before it arrives at the other station because the wavefront arrives at the own station first. Thus, $$R \cos \theta + R = T_1$$

$$\text{or } R = \frac{T_1}{1 + \cos \theta}$$

This is the locus of a parabola with the focus at the origin.

FIG. 1B illustrates the case when the wavefront arrives at the unknown other station first. In this case, $$R - (-R \cos\theta) = T_1$$

$$\text{or, } R = \frac{T_1}{1 + \cos \theta}$$

Thus, a unique parabola exists for both cases.

FIG. 1C illustrates two wavefronts, one originating from a distant radar with an azimuthal angle of 0° and with a TOA difference $T_1$, and the other wavefront originating from second radar with an angle of $\alpha$° and a TOA difference $T_2$. The two parabolas intersect at only two precise points which may be determined as follows:

$$R = \frac{T_1}{1 + \cos \theta} \quad \text{parabola 1}$$

$$R = \frac{T_2}{1 + \cos (\theta - \alpha)} \quad \text{parabola 2}$$

Therefore, $\frac{T_1}{1 + \cos \theta} = \frac{T_2}{1 + \cos (\theta - \alpha)}$ $T_1 + T_1 \cos \theta \, \alpha + T_1 \sin \theta \sin \alpha = T_2 + T_2 \cos$
$\cos \theta (T_1 \cos \alpha - T_2) + \sin \theta (T_1 \sin \alpha) = T\theta - T_1$ $$\frac{1 - \tan^2 \frac{\theta}{2}}{1 + \tan^2 \frac{\theta}{2}} (T_1 \cos \alpha - T_2) + \frac{2 \tan \frac{\theta}{2}}{1 + \tan^2 \frac{\theta}{2}} T_1 \sin \alpha = T_2 - T_1$$

$$(1 - \tan^2 \frac{\theta}{2}) (T_1 \cos \alpha - T_2) + 2 \tan \frac{\theta}{2} T_1 \sin \alpha = (T_2 - T_1)(1 + \tan^2 \frac{\theta}{2})$$

$$\tan^2 \frac{\theta}{2} (T_2 - T_1 \cos \alpha + T_1 - T_2) + 2 \tan \frac{\theta}{2} T_1 \sin \alpha + T_1 \cos \alpha - T_2 - T_2 + T_1 = 0$$

$$T_1 (1 - \cos \alpha) \tan^2 \frac{\theta}{2} + 2 T_1 \sin \alpha \tan \frac{\theta}{2} + T_1 (1 + \cos \alpha) - 2T_2 = 0$$

$$\tan \frac{\theta}{2} = \frac{-2T_1 \sin \alpha \pm \sqrt{4T_1^2 \sin^2 \alpha - 4T_1 (1 - \cos \alpha)[T_1 (1 + \cos \alpha) - 2T_2]}}{2T_1 (1 - \cos \alpha)}$$

$$= \frac{T_1 \sin \alpha \pm \sqrt{T_1^2 \sin^2 \alpha - T_1^2 \sin^2 \alpha + 2T_1 T_2 (1 - \cos \alpha)}}{T_1 (1 - \cos \alpha)}$$

$$= \frac{-T_1 \sin \alpha \pm \sqrt{2T_1 T_2 (1 - \cos \alpha)}}{T_1 (1 - \cos \alpha)} \boxed{= -\cot \frac{\alpha}{2} \pm \frac{\sqrt{T_2/T_1}}{\sin \frac{\alpha}{2}} = \tan \frac{\theta}{2}}$$

$$(1) \therefore \theta = 2 \tan^{-1} \left[ -\cot \frac{(\alpha)}{2} \pm \frac{\sqrt{T_2/T_1}}{\sin \frac{(\alpha)}{2}} \right]$$

The foregoing equation (1) defines from the own station the two angles of the two intersection points of the parabolas.

In order to determine which of the two angles pertains to the position of the unknown station, resort must be made to the slight angular difference between the radar signal to the other station and to the own station.

If the known station's azimuth from the radar is greater than the azimuth to the own station, let it be called leading. Mathematically, the unknown station's deviation may be specified:

If $\phi_u - \phi_o > 0$ leading (+)
Conversely, $\phi_u - \phi_o < 0$ lagging (−)
$\phi_u$ = azimuth of unknown station from radar
$\phi_o$ = azimuth of our station from radar.

Equation (1) determines two $\theta$ values. The correct one must satisfy two conditions:

Azimuth from radar 1

Condition 1. $\frac{\text{leading}}{0 \leq \theta \leq 180°} \quad \frac{\text{lagging}}{180° \leq \theta \leq 360°}$ Azimuth from radar 2

Condition 2. $\frac{\text{leading}}{\alpha \leq \theta \leq \alpha + 180°} \quad \frac{\text{lagging}}{\alpha + 180° \leq \theta \leq \alpha + 360°}$ In summary then, the bearing angle to the real location of the unknown station is determined as follows: First, the two $\theta$ values are computed in accordance with equation (1). Then, for radar 1, a determination is made as whether the unknown station is leading or lagging. For the proper deviation, a selection as to which of the computed bearing angles satisfy the limits of condition. If only one $\theta$ satisfies condition 1, the correct $\theta$ has been found. Condition 2 is not then required. If both $\theta$'s meet condition 1, the process is repeated for condition 2. Only the correct $\theta$ will satisfy condition 2. With the proper $\theta$ determined, substitution in the basic parabola $$R = \frac{T_1}{1 + \cos \theta}$$

will give the range.

Figure 1D:
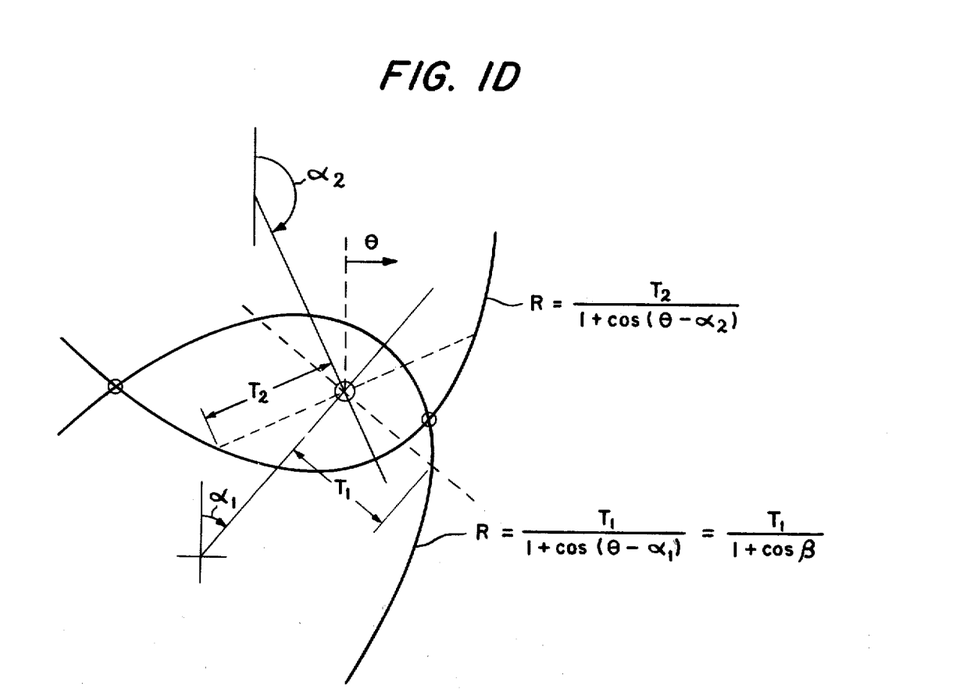

FIG. 1D illustrates the general case with radars emitting from azimuths $\alpha_1$ and $\alpha_2$ as shown with TOA differences $T_1$ and $T_2$, respectively.

First rotate the angular coordinates as follows:
Let $\beta = \theta - \alpha_1$
$\alpha = \alpha_2 - \alpha_1$
Thus, when $\theta = \alpha_1$, $\beta = 0$, the foregoing analysis applies with $\beta$ used instead of $\theta$.

Figure 2:
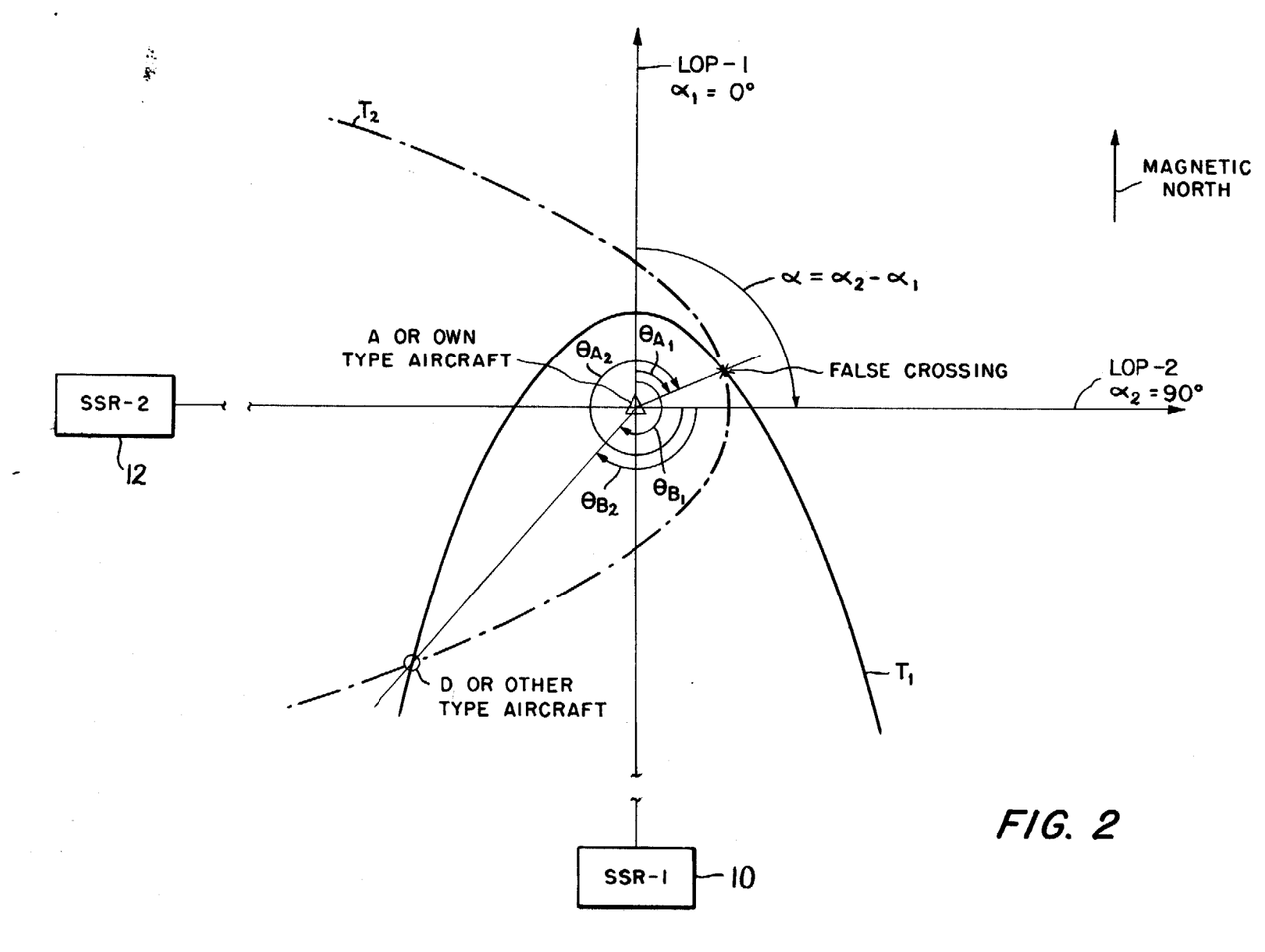
FIG. 2 is a geometrical diagram useful in explaining the preferred embodiment of a collision avoidance system shown in FIG. 3.

FIG. 2 illustrates the geometrical relationships between the signals in an airspace occupied by a reference or own aircraft incorporating a collision avoidance system, referred to as an A type aircraft and an unknown aircraft a plane within a preselected proximity to the A aircraft and without such a system, referred to as a D type aircraft. A pair of secondary surveillance ground stations 10 and 12, SSR-1 and SSR-2, respectively, repeatedly emit interrogations, including standard omnidirectional $P_1$ and $P_2$ suppression pulses indicated by the lines designated LOP-1 and LOP-2, respectively, at a frequency of 1030 MHz on a beam rotating in a clockwise direction. The interrogations are received at different angles and different times by the A aircraft and the D aircraft equipped only with a conventional SSR transponder. Generally, the air-to-air separation between the aircraft is significantly smaller than the distance between the aircraft and the interrogating ground stations so that the angles at which the A and D aircraft receive interrogations are virtually the same. In the FIG. 2 diagram, therefore, the lines of position (LOPs) to the two aircraft from each ground station can be considered parallel.

with respect to the angular relationships between the signals, $\alpha_1$ is the azimuth angle at which the A and D aircraft receive the 1030 MHz interrogations from SSR-1 as measured from the magnetic north of such ground station. The magnetic north reference is available in the aircraft and is independent of the heading of the aircraft. $\alpha_1$ is 0° in FIG. 2. Likewise, $\alpha_2$ is the azimuth angle at which the A and D aircraft receive the 1030 MHz interrogations from the ground station SSR-2 as measured from its magnetic north. $\alpha_2$ is 90° in FIG. 2, $\alpha$ equals $\alpha_2 - \alpha_1$ or 90°.

In accordance with the present invention, parabolic contours $T_1$ and $T_2$ are shown as representative of the two times of arrival for the reply signals generated by the D aircraft. The assumption of a parabolic curve surrounding one of the foci of an ellipse (A aircraft) is acceptable as long as the major axis of the ellipse is several times greater than the minor axis. Of course, as explained hereinafter, such assumption need not be made and the actual elliptcal contours for the times of arrival $T_1$ and $T_2$ may be used. Likewise, the differences between the azimuthal lines of position to the A and D aircraft may be computed and thus used in computing bearing angles. The mathematical expression, however, is rendered more complex. The assumptions here then as to time of arrival contours and azimuthal lines of position are made principally to simplify the explanation of the present invention.

As explained above, the curves $T_1$ and $T_2$ intersect at two points, one representing a true crossing (a real D aircraft location) and the other representing a false crossing (an imaginary D aircraft location). Such understanding is necessary in as much as the transponder replies of the D aircraft to the interrogations by SSR-1 and SSR-2, as detected by the A aircraft, will permit the developement of two time of arrival (TOA) values which will locate the D aircraft in two locations, the real and imaginary. Applicant's invention distinguishes the two locations and establishes the correct one, as will be explained hereinafter.

$\theta A_1$ is the bearing angle measured at the A aircraft from LOP-1 to the false crossing, while $\theta B_1$ is the bearing angle measured at the A aircraft from LOP-1 to the true crossing. Similarly, $\theta A_2$ and $\theta B_2$ are the bearing angles measured from the A aircraft relative to LOP-2 to the false and true crossings, respectively. Given the magnetic north information, the lines of position of SSR-1 and SSR-2 to the A and D aircraft and the times of arrival of the reply signals, the applicant, by his invention, determines the true bearing angle from the A aircraft to the D aircraft and the range between them. The preferred apparatus for carrying out such passive determination is shown in FIG. 3.

Figures 3, 3A:
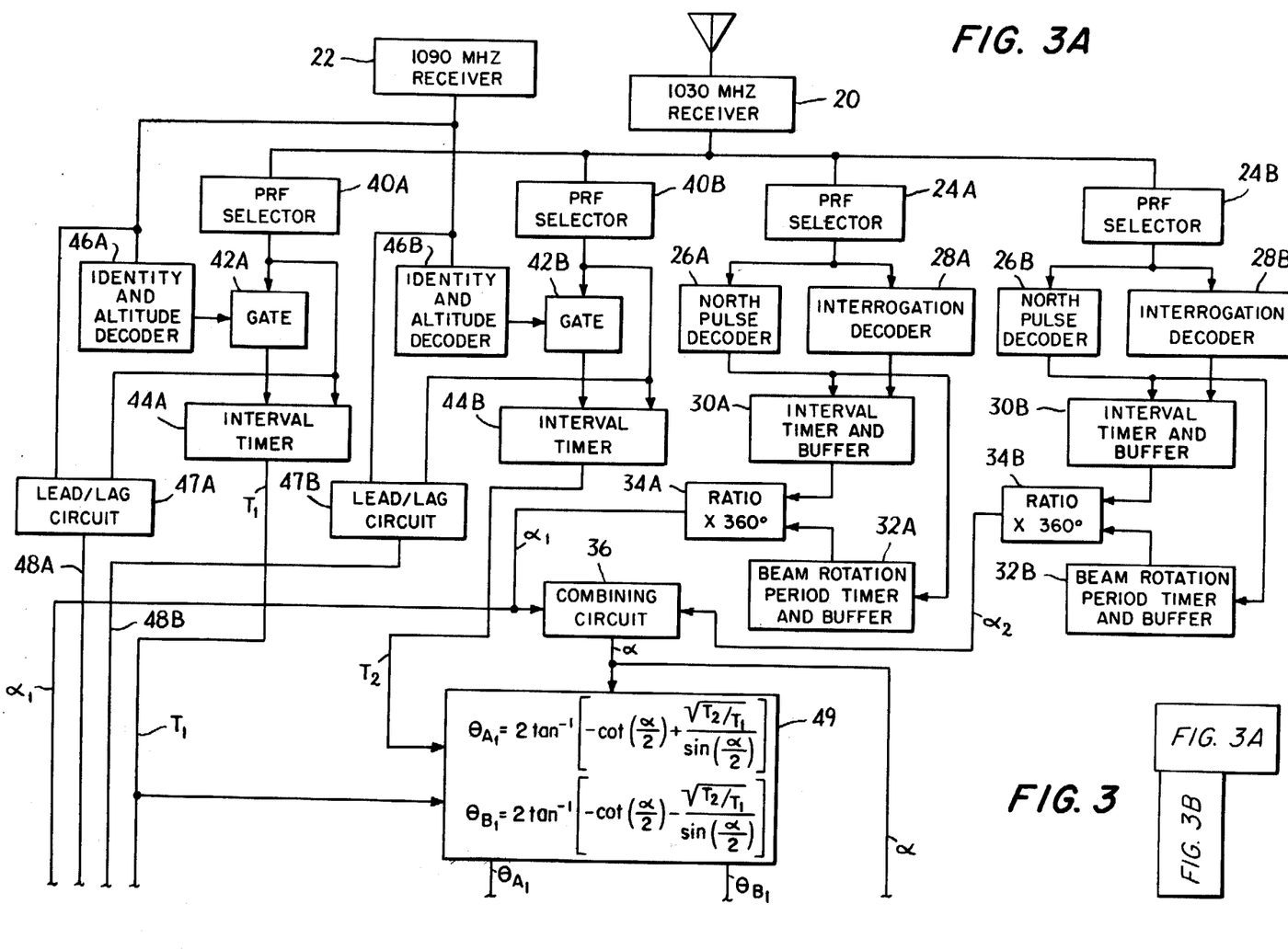
FIG. 3, which includes sections 3A and 3B, is a block diagram illustrating one preferred embodiment of a collision avoidance system arranged according to the present invention.
Figure 3B:
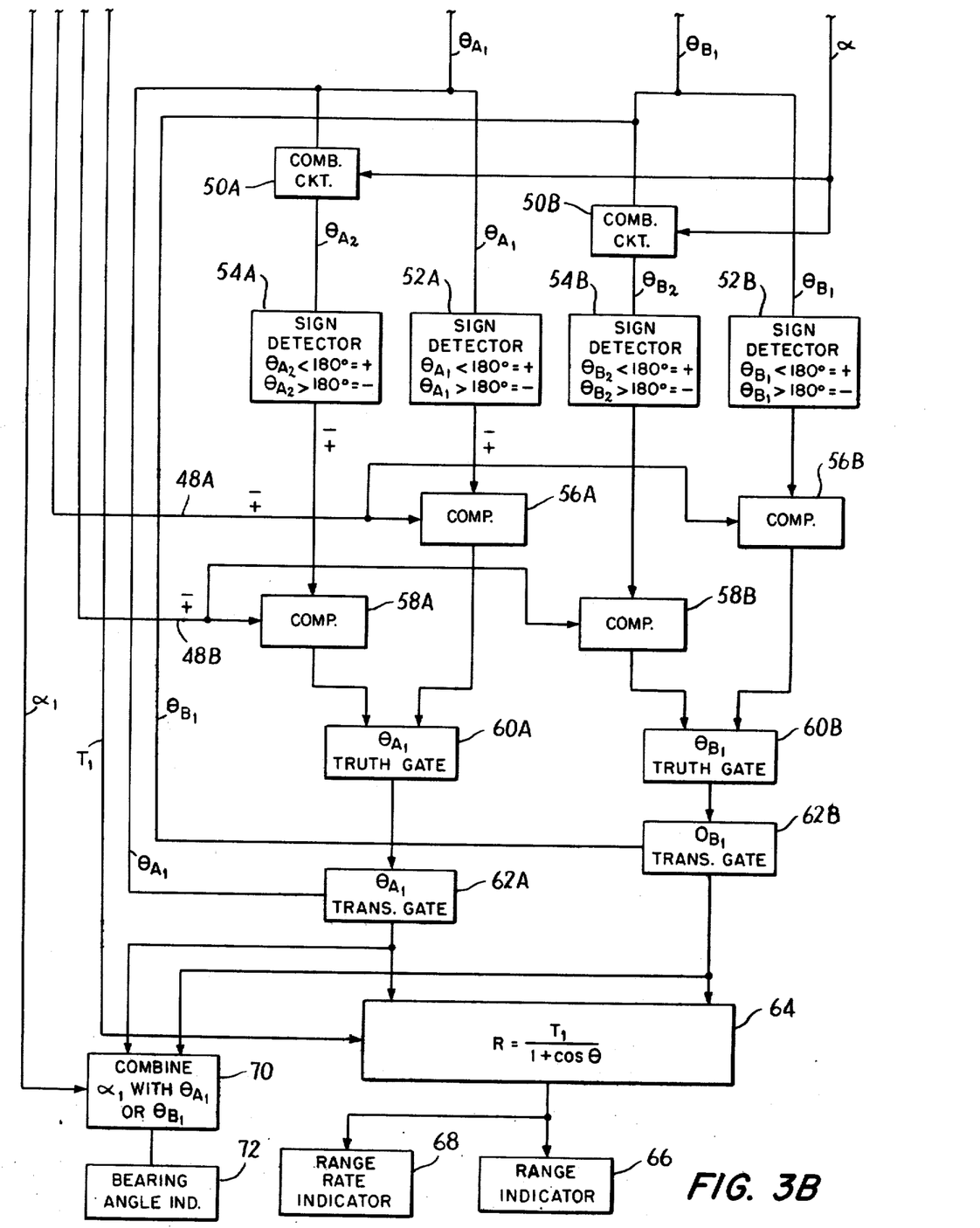

Referring then to FIG. 3, the collision avoidance system of the present invention installed in one's own aircraft (an A, B or C type aircraft using the legislative denominations) includes a first receiver 20 tuned to receive RF transmission signals at 1030 MHz and a second receiver 22 tuned to receive signals at 1090 MHz. Relating then the system of FIG. 3 to the FIG. 2 diagram, the 1030 MHz receiver 20 is adapted to receive the SSR-1 and SSR-2 interrogations which trigger a transmitter to emit 1090 MHz reply messages in response thereto. The 1090 MHz receiver receives and decodes the transponder replies of the D aircraft, including the D aircraft's identity and altitude. Since it is not a part of the present invention, there is not shown in FIG. 3 (or FIG. 5) apparatus for monitoring an azimuth sector wider than the rotating main beam of the radar. Such apparatus (which will be utilized) is shown in the Litchford U.S. Pat. No. 3,735,408 and the disclosure of this patent is incorporated herein by reference.

In order to compute the lines of position (LOP-1 and LOP-2) from the A aircraft to SSR-1 and SSR-2, respectively, the system comprises a pair of pulse repetition frequency (PRF) selectors 24A and 24B which simultaneously "tune" the system to the unique pulse repetition frequencies of SSR-1 and SSR-2 ground stations and no other. A typical PRF selector, as well as the circuitry for determining the lines of position and modifying a standard SSR to generate North pulses are fully described in my U.S. Pat. No. 3,757,324, and thus need not be described in detail herein. Briefly, however, the lines of position to SSR-1 and SSR-2 are comuputed by North pulse decoders 26A, 26B, interrogation decoders 28A, 28B, interval timers and buffers 30A, 30B, beam rotation period timers and buffers 32A, 32B and ratio circuits 34A, 34B respectively. As an alternative to the method for generating North pulses described in my patent, SSRs may be simply modified to transmit omnidirectionally three pulses, the normal $P_1$, the normal $P_2$ and $P_2A$, and $P_2B$ spaced two microseconds apart each time the scanning beam rotates through magnetic north. This triad of pulses could be encoded into a single omnidirectional burst of north pulses by any number of known ways.

The operation of the A and B circuitry to calculate the lines of position (LOP-1 and LOP-2) to SSR-1 and SSR-2 is the same so that the operation of only one need be described. Thus, the A circuitry produces signals representing the line of position to the fixed ground station SSR-1 as measured from its magnetic north ($\alpha_1$) in the following manner: whenever the 1,030 MHz receiver 20 receives a burst of several north pulse triads, the burst envelope is detected by the decoder 26A and a signal is applied to the timers 30A and 32A to turn them on. Some time later, when the beam from SSR-1 scans the A aircraft, the beam interrogations are detected by the decoder 28A and a signal is applied to the timer 30A to cause the transfer of an accumulated time value to its output buffer. The time value accumulated by the timer 32A is transferred to its output buffer upon receipt of the next north pulse burst, i.e., every complete rotation by the beam. The respective buffers supply these time values to the ratio circuit 34A which retains such values until new time values are computed and the buffers updated. SSRs rotate at different angular velocities requiring circuitry to accommodate any rotational period by the scanning beam.

Thus, the ratio circuit 34A determines the ratio between the signal received from the timer 30A and the signal received from the timer 32A to produce an output signal of proper scale, representing the angle $\alpha_1$ in degrees. As an example, if the beam of the SSR-1 ground station to which the circuit is tuned rotates 360° in 4 seconds, and if it takes 500 milliseconds from the time the North pulse burst is received until the beam passes over the A aircraft, the angle $\alpha_1$ will be computed as (360°/8) or 45°. The circuits 26B – 34B operate in the same manner to determine the line of position ($\alpha_2$) to the SSR-2 as measured from magnetic north.

In order to determine the angle between the lines of position to the SSRs, the signals representing the angles $\alpha_1$ and $\alpha_2$ are passed along correspondingly labelled conductors to a combining circuit 36 where the values of the two signals are subtracted from each other. The output signal, denoted $\alpha$ represents the angular difference clockwise between LOP-1 and LOP-2 using LOP-1 as the reference.

Currently with the determination of the lines of position to SSR-1 and SSR-2, the times of arrival at the A aircraft of the transponder replies of the D aircraft are determined (FIG. 2). To this end, the collision avoidance system of the present invention comprises a pair of PRF selectors 40A and 40B which, like the selectors 24A and 24B, respond only to the interrogations of the SSR-1 and SSR-2 ground stations. The interrogation signals are passed on to the input terminals of a pair of gates 42A and 42B which are enabled by the $P_3$ pulses of the 1,030 MHz interrogations. At the same time, the $P_3$ pulses are supplied to a pair of interval timers 44A and 44B to clear the timers and turn them on.

The transponder reply signals of the D aircraft detected by the 1,090 MHz receiver 22 are supplied to a pair of reply, altitude and identity decoders 46A and 46B which decode the replies and supply them to the other input terminals of the gates 42A and 42B. In addition, the reply decoders respond to the mode C replies that indicate the intruder aircraft is within a predetermined common altitude band. As disclosed in my U.S. Pat. No. 3,735,408, the decoders decode the altitude mode C replies to ascertain the altitude of the other aircraft and also produce signals representative of its own aircraft. The signals are compared to produce common altitude stratum signals if the altitudes are with a selected range, e.g., $\mp 2000$ feet. Also, the decoders 46A and 46B decode the mode A signals to identify the other aircraft. Although not shown, the decoders 46A and 46B may be tied together through a comparator in order to assure correspondence between the identity of the reporting other aircraft. In this way, replies from aircraft beyond a certain common altitude stratum or from different aircraft will be discarded. In turn, the gates enabled by the $P_3$ pulses of the associated interrogations, supply the replies to the interval timers 44A and 44B to turn the timers off. Thus, the output signals developed by the timers 44A and 44B represent the times of arrival of the reply signals at the own or A aircraft generated by the transponder of the D aircraft in response to interrogations by the SSR-1 and SSR-2 ground stations. The conversion of TOA values representing the parabolas may be made by dividing the time values by 6.1838 microseconds since radiation travels 1 NM in 6.1838 microseconds. With such conversion, the time of arrival values in terms of geographic parabolas, designated herein as $T_1$ and $T_2$ (corresponding to SSR-1 and SSR-2, respectively), are determined. The $T_1$ and $T_2$ signals are carried along correspondingly labelled conductors.

The system further includes a pair of lead/lag circuits 47A and 47B which develop either negative or positive voltage levels in response to the timing sequence of the 1030 MHz interrogation signals and the reception of the 1090 MHz reply signals. To this end, the reply signals as detected by the 1,090 MHz receiver 22 are also supplied to the input terminals of the circuits 47A and 47B and the interrogation signals, as detected by the selectors 40A and 40B are supplied to other input terminals of the circuits 47A and 47B.

As explained in my U.S. Pat. No. 3,757,324 wherein a typical lead/lag circuit is described and shown (FIG. 7), all SSR beams rotate clockwise as viewed from above. When the SSR-1 beam illuminates the A or own aircraft carrying the apparatus of FIG. 3 before illuminating the D aircraft the circuit 47A generates a positive voltage level. Alternatively, when the D aircraft is illuminated by the SSR-1 scanning beam before the A aircraft, which is the case in FIG. 2, the circuit supplies a negative voltage level. Similarly, the lead/lag circuit 47B supplies a positive voltage level when the SSR-2 beam illustrates the A aircraft before the D aircraft, which is the case in FIG. 2, and a negative signal when the SSR-2 beam illuminates the D aircraft before illuminating the A aircraft. The plus or minus signals developed by the lead/lag circuits form part of a truth table, explained hereinafter, which resolve the ambiguities resulting from the dual crossings of the wavefronts $T_1$ and $T_2$. The plus or minus voltage level signals developed by the circuits 47A and 47B are carried by conductors 48A and 48B, respectively. It is noteworthy that in addition to the lead/lag data, the azimuthal separation between the A and D aircraft relative to selected SSR stations may be determined. This angular difference (assumed to be zero in the FIG. 2 diagram) and its polarity is utilized in mathematical solution for determining bearing angle and range given hereinabove.

In accordance with the present invention, during each sweep by the beams of SSR-1 and SSR-2, the signals representative of the times of arrival $T_1$ and $T_2$ and the signal ($\alpha$) representative of the angular difference between the lines of position are supplied to a logic circuit 49 wherein the bearing angles $\theta A_1$ and $\theta B_1$ are computed in accordance with the following formulae:

$$\theta A_1 = 2 \tan^{-1} \left[ -\cot \left( \frac{\alpha}{2} \right) + \frac{\sqrt{T_2/T_1}}{\sin \frac{\alpha}{2}} \right]$$

$$\theta B_1 = 2 \tan^{-1} \left[ -\cot \left( \frac{\alpha}{2} \right) - \frac{\sqrt{T_2/T_1}}{\sin \frac{\alpha}{2}} \right]$$

The foregoing equations determine the two bearing angles from the A aircraft to the two intersection points of the parabolic wavefronts shown in FIG. 2. Thus, $\theta A_1$ is the bearing angle from the A aircraft to the false position of the D aircraft using LOP-1 as a reference. $\theta B_1$ is the bearing angle from the A aircraft to the actual position of the D aircraft using LOP-1 as a reference. The computation of the $\theta A_1$ and $\theta B_1$ angles may be carried out in conventional microcomputer circuits such as those incorporated in the widely used Hewlett-Packard HP-35.

The signals representative of the computed bearing angles $\theta A_1$ and $\theta B_1$ are carried along correspondingly designated conductors to combining circuits 50A and 50B and to a pair of sign detector circuits 52A and 52B. In the combining circuits 50A and 50B, the signal representative of the angular difference between LOP-1 and LOP-2 is subtracted from the $\theta A_1$ and $\theta B_1$ signals to develop signals representative of bearing angles $\theta A_2$ and $\theta B_2$. The $\theta A_2$ and $\theta B_2$ signals are likewise supplied along correspondingly labelled conductors to a pair of sign detector circuits 54A and 54B. In the sign detector circuits 52A, 54A, 52B, 54B the signals are compared against a fixed reference signal representing 180° to develop positive signals in the event the supplied angles are less than 180° and negative signals in the event the supplied angles are greater than 180°. Thus, the four outputs from the sign detector circuits 52A, 54A, and 52B, 54B will become combination of positive and negative voltages which contain the required information to permit the selection of the bearing angle to the actual location of the D aircraft. Significantly, the imaginary location or ambiguous second crossing of the two parabolas is identified as false and eliminated.

The circuitry for eliminating the false crossing and determining the true bearing angle comprises a comparator circuit 56A to which the sign of the $\theta A_1$ signal is supplied, a comparator circuit 58A to which the sign of the $\theta A_2$ signal is supplied, a comparator circuit 56B to which the sign of the $\theta B_1$ signal is supplied and a comparator circuit 58B to which the sign of the $\theta B_2$ signal is supplied. The other input terminals of the comparators 56A and 56B are supplied with either positive or negativie voltage levels from the lead/lag circuit 47A. In a like manner, the comparator circuits 58A and 58B are supplied with positive or negative voltage levels developed by the lead/lag circuit 47B.

As described above, the lead/lag circuits 47A and 47B develop positive voltage levels in response to the early detection of the 1,030 MHz interrogation of the A aircraft and negative voltage levels in response to the early detection of the 1,090 MHz replies from the D aircraft. The comparators are designed to operate in response to preselected polarities appearing at their input terminals. Thus for instance, the comparators 56A and 58A respond only to either two positive or two negative input signals to supply positive output signals along a conductor leading to an AND gate 60A, referred to as the $\theta A_1$ truth gate. Comparators 56B and 58B are likewise designed to respond to either two positive or two negative input signals to supply positive output signals along conductors leading to an AND gate 60B, designated as the $\theta B_1$ truth gate. When signals of opposite polarity are supplied to the input terminals of the comparators 56A, 58A and 56B, 58B, the comparators supply negative output signals.

The gates 60A and 60B which may be of typical "AND" gate construction respond to positive input signals of equal amplitude to supply enabling signals along conductors leading to a pair of transmission gates 62A and 62B. The other input terminals of the transmission gates 62A and 62B are supplied with the signals representative of the bearing angles $\theta A_1$ and $\theta B_1$, respectively. Depending upon which of the truth gates 60A or 60B is enabled, the transmission gate 62A or 62B will transmit the true bearing angle, be it $\theta A_1$ or $\theta B_1$ to a logic circuit 64 wherein the range between the A and D aircraft is calculated.

The circuit 64 calculates the range (R) in accordance with the following equation:

$$R = \frac{T_1}{1 + \cos \theta}$$

where $\theta$ is the angle selected from either $\theta A_1$ or $\theta B_1$ and $T_1$ is the time of arrival of the reply signal from the D aircraft generated in response to interrogation by the ground station SSR-1. The signal representative of range is then supplied to an indicator 66 where the range is displayed and to a range rate indicator 68 where the range rate is displayed.

$\theta A_1$ and $B_1$ are the bearing angles as measured at aircraft A relative to the line of position from SSR-1 to the D aircraft. In order for aircraft A to compute the bearing angle with respect to magnetic north, the output terminals of the transmission gates 62A and 62B are also supplied to a logic circuit 70 where the signals representative of such bearing angles are combined with the signal representative of the angle $\alpha_1$ to develop a signal representative of the true bearing angle. This angle is then displayed by a bearing angle indicator 72.

It is well known that range and range rate can be combined to obtain the value TAU, or time to collision. If the TAU value is small enough, a command signal is generated which directs the pilot to climb or descend to avoid the approaching aircraft. Bearing angle, range rate and range may be combined to restrict the generation of command signals to those instances where there is a real possibility of a collision. Specifically, the transverse velocity of the other aircraft may be calculated from such signals. If the velocity is increasing, the TAU circuitry will be inhibited. If the velocity is decreasing, the TAU circuitry will be enabled and the pilot directed to take corrective action immediately. The TAU logic is described in detail in the Air Transport Association's report entitled "ANTC-117".

With the airspace and ground configuration as that shown in FIG. 2 where $\alpha$ equals 90°, and assuming $T_1 = 2$ and $T_2 = 3$, $\theta A_1$ and $\theta B_1$ may be calculated as follows:

$$\theta A_1 = 2 \tan^{-1} \left[ -\cot \frac{\alpha}{2} + \frac{\sqrt{T_2/T_1}}{\sin \frac{\alpha}{2}} \right]$$

$$= 2\left[-1 + \frac{1.225}{.707}\right]$$

$$= 2 \tan^{-1} [.74] = 2(36°) = 72°$$

$$\theta B_1 = 2 \tan^{-1} [-2.74] = 2(-69°) = -138°$$

$$\theta B_1 = 360° - 138° = 222°$$

$$\theta A_2 = 72° - 90° = 342°$$

$$\theta B_2 = 222° - 90° = 132°$$

Relative to the lead/lag circuitry, conductor 48A will have a negative voltage level and conductor 48B will have a positive voltage level. The outputs from sign detector circuits 52A and 54B will be positive; the outputs from sign detector circuits 52B and 54A will be negative.

With the foregoing voltage configuration, comparators 56A and 58A will be disabled; comparators 56B and 58B will be enabled. The $\theta B_1$ truth gate 60B will likewise be enabled and the value of $\theta B_1$, the true bearing angle transmitted to logic circuit 64. False bearing angle $\theta A_1$ is eliminated. The range R may then be calculated as follows:

$$R = \frac{2}{1 + \cos 222°} = \frac{2}{1 - .74} = 7.7$$

The collision avoidance system of FIG. 3 utilizes the interrogation of a pair of SSR ground stations and the D aircraft's replies thereto to compute the range and bearing angle from the A aircraft to the D aircraft. When more than two ground stations are available, the computation is technologically simplified.

Figure 4:
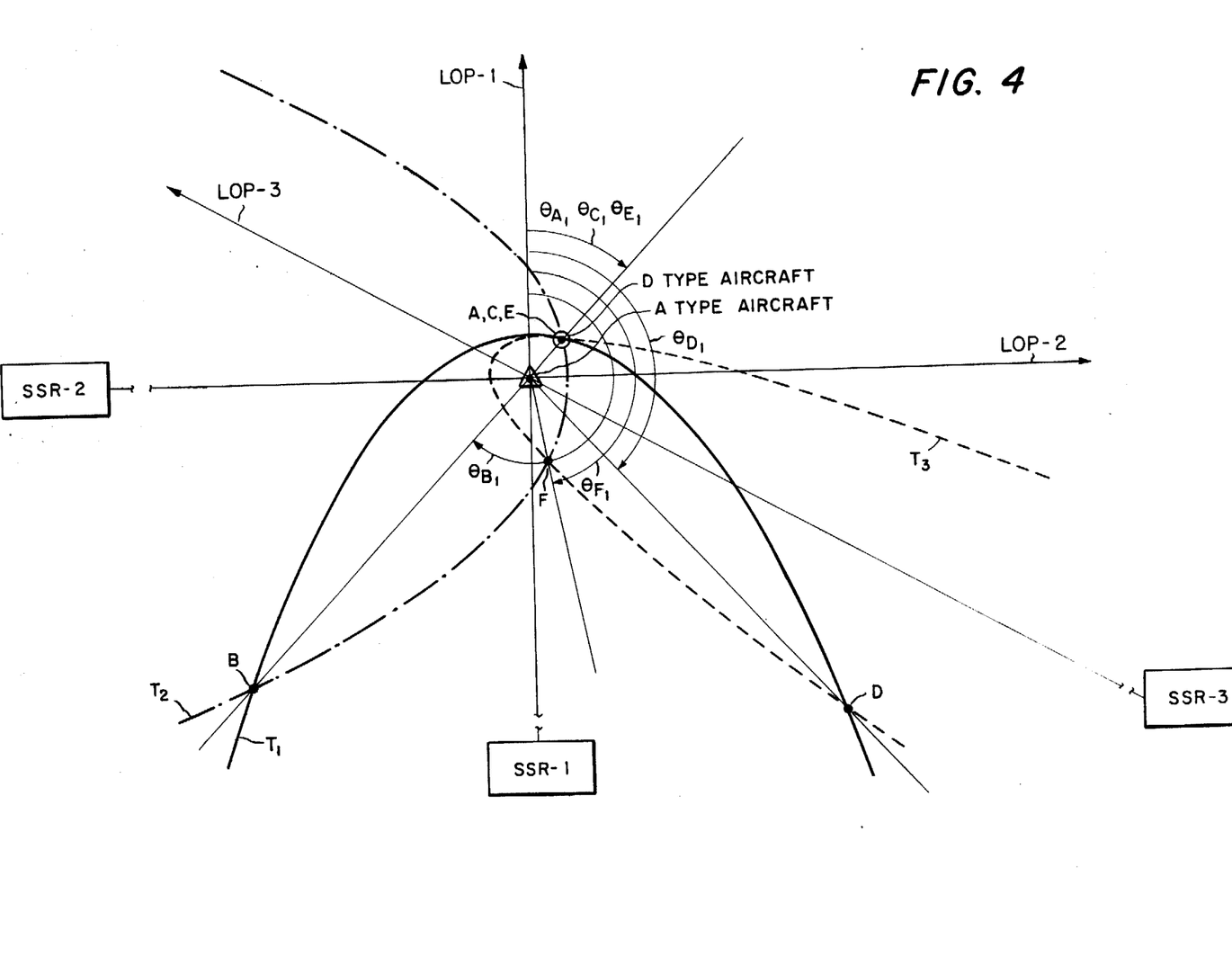
FIG. 4 is a geometrical diagram useful in explaining the preferred embodiment of a collision avoidance system shown in FIG. 5.

Thus, referring to FIG. 4, there are shown three fixed ground stations labelled SSR-1, SSR-2 and SSR-3, respectively, which interrogate an A aircraft and a D aircraft located in a selected proximity to the A aircraft. The A aircraft is shown as a triangle, while the D aircraft is shown as a circle. The lines of position to the A aircraft are labelled LOP-1, LOP-2 and LOP-3. Parabolic contours for the TOA signals as measured by the A aircraft are labelled $T_1$, $T_2$ and $T_3$, respectively. As explained hereinabove, the contours have approximately parabolic shapes (actually elliptical), with each of the parabolas intersecting at two points, a true location and a false location of the intruder or D aircraft.

The intersections of the parabolic wavefronts $T_1$, $T_2$ and $T_3$ at the true location of the D aircraft are labelled A, C and E; A representing the crossing $T_1$–$T_2$, C representing the crossing $T_1$–$T_3$ and E representing the crossing $T_2$–$T_3$. The false crossing of the two parabolas $T_1$ and $T_2$ is indicated by the letter B, the false crossing of the parabolas $T_1$ and $T_3$ is indicated by the letter D and the false crossing of the parabolas $T_2$ and $T_3$ is indicated by the letter F.

Also shown are four separate arcs, indicating the angular bearing of the A aircraft to the true and false crossings as measured from LOP-1. The angles thus to the true crossing are $\theta A_1$, $\theta C_1$ and $\theta E_1$. The angles, as measured from LOP-1 to the false crossings B, D and F are labelled, respectively, $\theta B_1$, $\theta D_1$ and $\theta F_1$. The collision avoidance apparatus shown in FIG. 5 utilizes the lines of position to the ground station SSRs and the times of arrival of the three transponder replies to these same SSRs of the interrogated D aircraft to calculate the bearing angle and slant range to such D aircraft.

Figures 5, 5A:
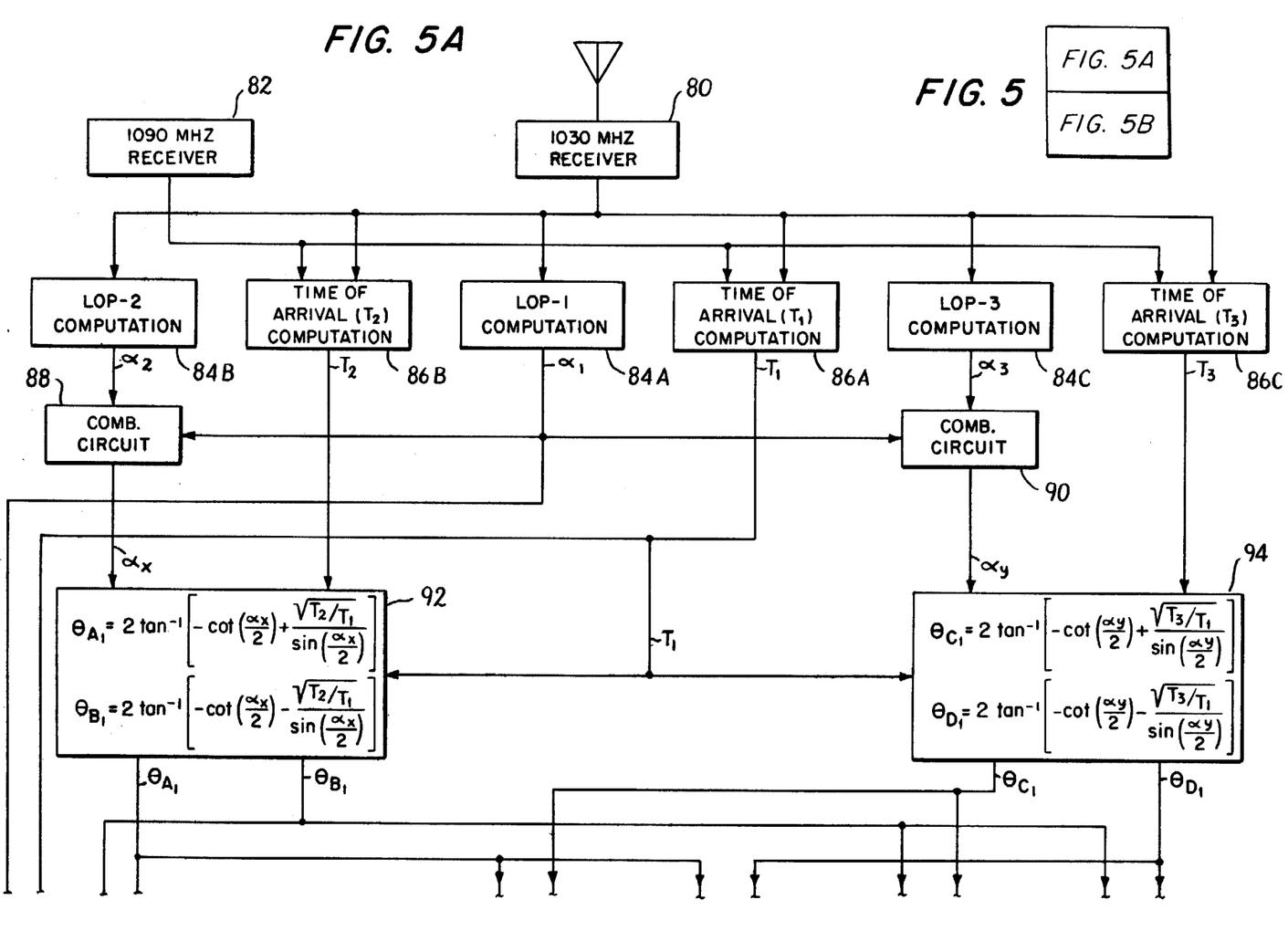
FIG. 5, which includes sections 5A and 5B, is a block diagram illustrating a second preferred embodiment of a collision avoidance system arranged according to the present invention.
Figure 5B:
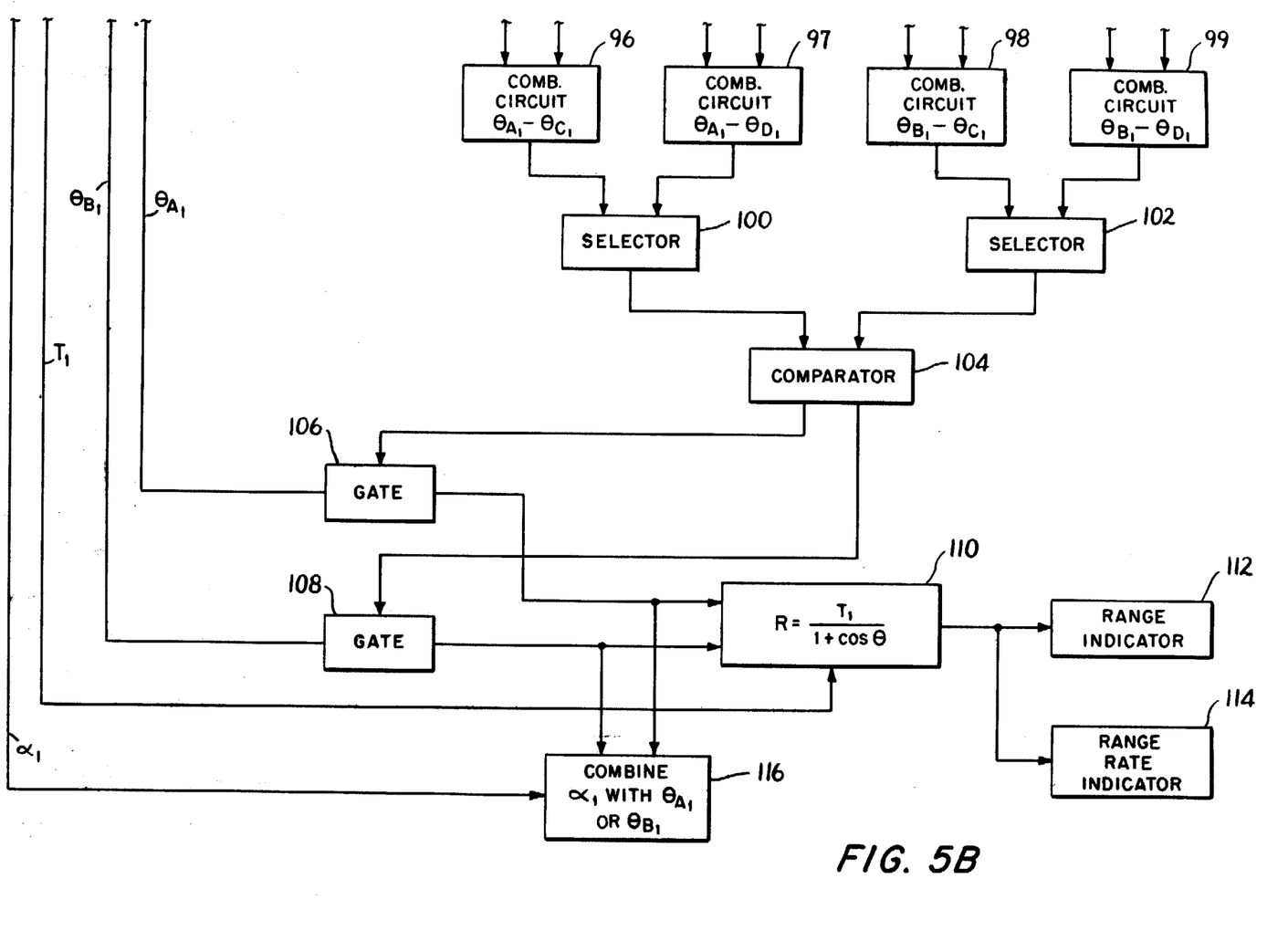

Hence, the system includes a 1,030 MHz receiver 80 and a 1,090 MHz receiver 82. Also provided are line of position (LOP) circuits 84A, 84B and 84C, exemplary configurations of which are shown in FIG. 2 and described hereinabove, which calculate the azimuthal lines of position $\alpha_1$, $\alpha_2$, and $\alpha_3$ from the A aircraft to SSR-1, SSR-2 and SSR-3 ground stations, respectively.

In order to compute the times of arrival at the A aircraft of the replies generated by the transponder equipped D aircraft in response to the interrogations by the three SSRs, time of arrival calculation circuits 86A, 86B and 86C are identified by the letters $T_1$, $T_2$ and $T_3$, respectively. The conductors to which the signals are supplied are identified by the same letters.

The $\alpha_1$ and $\alpha_2$ signals are supplied to a combining circuit 88 wherein the $\alpha_1$ signal is subtracted from the $\alpha_2$ signal to provide an angular difference signal $\alpha x$. Similarly, the $\alpha_1$ signal is subtracted from the $\alpha_3$ signal in a combining circuit 90 to provide as an output the angular difference signal $\alpha y$.

The angular difference signal $\alpha x$ and the signals representative of the times of arrival $T_2$ and $T_1$, are supplied to logic circuit 92 wherein the angles $\theta A_1$ and $\theta B_1$ are computed in accordance with the following formulae:

$$\theta A_1 = 2 \tan^{-1}\left[-\cot \frac{\alpha x}{2} + \frac{\sqrt{T_2/T_1}}{\sin \frac{\alpha x}{2}}\right]$$

$$\theta B_1 = 2 \tan^{-1}\left[-\cot \frac{\alpha x}{2} - \frac{\sqrt{T_2/T_1}}{\sin \frac{\alpha x}{2}}\right]$$

Similarly, the angular difference signal $\alpha y$ and the signals representative of the times of arrival $T_3$ and $T_1$ are supplied to the logic circuit 94 wherein the angles $\theta C_1$ and $\theta D_1$ are computed in accordance with the following equations:

$$\theta C_1 = 2 \tan^{-1}\left[-\cot \frac{\alpha y}{2} + \frac{\sqrt{T_3/T_1}}{\sin \frac{\alpha y}{2}}\right]$$

$$\theta D_1 = 2 \tan^{-1}\left[-\cot \frac{\alpha y}{2} - \frac{\sqrt{T_3/T_1}}{\sin \frac{\alpha y}{2}}\right]$$

As shown in FIG. 4, only the wavefront pairs associated with SSR-1 and SSR-3 and with SSR-1 and SSR-2 are utilized in the computation. The pairs associated with SSR-2 and SSR-3 may also be used, in which event the angular values $\theta E_1$ and $\theta F_1$ would be calculated. However, as long as there is sufficient spacing between SSRs and, accordingly, a sufficiently large angular difference between lines of position, two pairs will suffice, be they between SSR-1 and SSR-2, SSR-1 and SSR-3 or between SSR-2 and SSR-1, SSR-2 and SSR-3. In any event, the line of position associated with the two largest times of arrival should be used as the standard of comparison.

The signals representative of the computed angles $\theta A_1$, $\theta B_1$, $\theta C_1$ and $\theta D_1$ are then supplied along correspondingly labelled conductors to four combining circuits 96, 97, 98 and 99 where the angles representative of true and false crossing points are subtracted. Thus, $\theta C_1$ is subtracted from $\theta A_1$ in circuit 96, $\theta D_1$ is subtracted from $\theta A_1$ in circuit 97, $\theta C_1$ is subtracted from $\theta D_1$ in circuit 98 and $\theta D_1$ is subtracted from $\theta B_1$ in circuit 99. As will be apparent from FIG. 4, the magnitudes of the differences will be zero (theoretically) and in the least minimal at the true crossing point (A, C, E) and large at the false crossings (B, D, F). Thus, combining circuits 96, 97, 98 and 99 determine that two of the four angles are equal and that the angular difference between them is zero or a very small value.

Signals with magnitudes representative of the angular differences as determined by the circuits 96, 97 and 98, 99 are then supplied to a pair of selector circuits 100 and 102, respectively, which transmit only the signals with the smallest magnitudes. With correspondence between the angles $\theta A_1$ and $\theta C_1$, the selector 100 supplies a zero voltage signal output, while the selector 102 supplies a signal output having a magnitude representative of the smallest angular variation between the angles $\theta B_1$, $\theta C_1$ and $\theta B_1$, $\theta D_1$.

The smallest angular variation signals are then supplied to a comparator 104 which compares the two signals and, depending on which of the signals has the smallest magnitude supplies an enabling signal to $\theta A_1$ enable gate 106 or an enabling signal to a $\theta B_1$ enable gate 108. Logic circuits 92 and 94 supply the $\theta A_1$ and $\theta B_1$ signals to the other input terminals of the gates 106 and 108, as indicated by the conductors labelled $\theta A_1$ and $\theta B_1$.

Thus, depending upon which of the gates 106 and 108 is enabled, the gate will transmit the true bearing angle, either $\theta A_1$ or $\theta B_1$ to a logic circuit 110 wherein the range between the A and D aircraft is determined. According to the present invention, the circuit 110 calculates the range in accordance with the equation:

$$R = \frac{T_1}{1 + \cos \theta}$$

where $\theta$ will be either $\theta A_1$ or $\theta B_1$. The signal $T_1$ is supplied along the conductor labelled T to another input terminal of the circuit 110 in order to implement the calculation.

From the logic circuit 110 the range representative signal is supplied concurrently to a range indicator 112 and a range rate indicator 114. The range indicataor displays the range, while the range rate indicator 114 displays the range rate in knots. As shown in FIG. 4, $\theta A_1$ and $\theta B_1$ are the bearing angles as measured from the line of position of the A aircraft to the SSR-1 ground station. A circuit 116 is thus provided which combines the angle $\alpha_1$ which is the angle between magnetic north and LOP-1 with either $\theta A_1$ or $\theta B_1$ depending upon which of the gates 106 or 108 is enabled. The resultant signal represents the true bearing with respect to magnetic north.

It will be noted that the system of FIG. 5 utilizes two or more coincident bearing angles measured from a selected line of position, whereas the system of FIG. 3 utilizes lead/lag logic to separate the true crossing from the false crossing. Thus, as the environment of SSR ground stations changes, either or both methods can be used to compute the true bearing angle and the true slant range to the other aircraft. In each instance, the computation is done entirely passively and the requirements of the proposed legislation met.

Although the applicant's invention has been described with respect to two illustrative embodiments it will be understood that the invention is susceptible of modifications. Thus, for instance, in an environment where the A and D aircraft are interrogated by a multiplicity of ground stations, angular selection logic may be incorporated to select the lines of position with greatest angular separation, rather than randomly selecting the ground stations or expanding the logic to accommodate all such ground stations. Also, the assumptions of parabolic contours for the TOAs and the angular equality of the azimuthal lines of position to the own and other aircraft are not critical, but have been made to simplify the description of the applicant's invention. The angular difference between the azimuthal lines of position to the own and other aircraft may be determined. In such a case, the elliptical contour of the curve surrounding one of the foci of an ellipse (own aircraft) is utilized, with bearing angle and slant range being computed in accordance with the equations given hereinabove. Also, the own aircraft may estimate the range to the SSR ground stations, as well as to the other aircraft.

I claim:

1. In a system for collision avoidance and/or proximity warning indication at an own location utilizing the signals transmitted by scanning beam secondary surveillance radar (SSR) stations and reply messages transmitted by a nearby transponder replying to said SSR signals, apparatus for passively determining the bearing angle from said own location to said transponder comprising:

a. means responsive to said SSR ground station signals for generating signals representative of the azimuthal lines of position from selected radar stations to the own location and to the location of said transponder;

b. means responsive to selected reply messages transmitted by said transponder and responsive to the SSR ground station signals for providing signals representative of the time of arrival of each of said selected reply messages at said own location; and c. means responsive to signals representative of selected azimuthal lines of position and to the corresponding signals representative of selected times of arrival for providing a signal indicative of the bearing angle from the own location measured from said lines of position to the location in space from which the transponder replies originate.

2. Apparatus according to claim 1 for passively determining the range to said transponder from said own location comprising:

d. means responsive to one of said selected times of arrival representative signals and the signal indicative of the bearing angle for providing a signal representing the distance separating said transponder from said own location.

3. Apparatus according to claim 2 wherein the own location is an aircraft and said transponder is located on another aircraft, further comprising:

e. means for decoding altitude reporting signals forming a part of the transponder replies from the other aircraft;

f. means for producing similar own aircraft altitude signals;

g. means for comparing said altitude reporting signals and said similar own aircraft altitude signals to produce common altitude stratum signals; and h. means responsive to the presence of said common altitude stratum signals for controlling the means for providing the bearing angle indicative signals and the means for providing the distance indicative signals.

4. Apparatus according to claim 3 further comprising:

i. means for decoding the identity reporting signals in the transponder replies of the other aircraft;

j. means for determining correspondence between said identity reporting signals; and k. means for controlling the means for providing the bearing angle indicative signals in accordance with the correspondence between said identity reporting signals.

5. Apparatus according to claim 2 further comprising:

l. first indicator means responsive to said range representative signal for displaying the distance separating the own location from said transponder; and m. second indicator means responsive to said range representative signal for providing signals indicative of the rate of change of said range representative signal and including means for displaying said range rate.

6. Apparatus according to claim 2 comprising:

n. third indicator means responsive to the bearing angle representative signal for displaying the bearing of said transponder.

7. Apparatus according to claim 2 wherein the means for providing a bearing angle indicative signal comprises means responsive to the signals representative of selected azimuthal lines of position and to the corresponding signals representative of selected times of arrival for providing signals indicative of the bearing angles from the own location measured from said lines of position to the locations in space from which transponder replies actually originate and from which transponder replies apparently originate.

8. Apparatus according to claim 7 wherein the means for providing a bearing angle indicative signal comprises means responsive to signals representative of selected azimuthal lines of position originating from geographically separated SSR stations for providing signals representative of the angular differences between said selected azimuthal lines of position and means responsive to said angular difference signals and to signals representative of the corresponding times of arrival for generating said actual and apparent bearing angle indicative signals.

9. Apparatus according to claim 7 further comprising:

o. truth table means responsive to preselected relationships between said bearing angle indicative signals, said truth table means comprising means for identifying said signals as indicative of either the true bearing angle to the locations in space from which the transponder replies actually originate or the false bearing angles to the locations in space from which the transponder replies apparently originate and means for transmitting the signal representative of the actual bearing angle and blocking the signals representative of the apparent bearing angles.

10. Apparatus according to claim 9 wherein two secondary surveillance radar stations interrogate said own location and said transponder and wherein the truth table means comprises means for assigning said actual and apparent bearing angle representative signals selected polarities in accordance with their angular magnitudes, lead/lag logic means responsive to the reply messages transmitted by said transponder for developing signals with selected polarities in accordance with the azimuthal positioning of said transponder relative to the own location's azimuth from the secondary surveillance radars, means for comparing said assigned polarities and the signals developed by said lead/lag logic means to determine the true bearing by polarity, and means controlled by said comparator means for transmitting the actual bearing angle representative signal and eliminating the apparent bearing angle representative signals.

11. Apparatus according to claim 9 wherein at least three secondary surveillance radar stations interrogate said own location and said transponder and wherein said means for providing a bearing angle indicative signal comprises means responsive to selected azimuthal lines of position and to corresponding signals representative of selected times of arrival for developing signals indicative of at least four bearing angles as measured from the azimuthal lines of position from one of said secondary surveillance radar stations to the locations in space from which transponder replies actually and apparently originate.

12. Apparatus according to claim 11 wherein the truth table means comprises compartor means responsive to said bearing angle indicative signals for determining the coincidence in magnitude between two of said bearing signals, such two signals being essentially equal and consequently representative of the actual bearing angle, and further comprising means controlled by said comparator means for transmitting the actual bearing angle representative signal and eliminating the apparent bearing angle representative signals.

13. A method for passively determining the bearing of a transponder within a selectable proximity to one's own position from the interrogation replies of the transponder in the coverage of a secondary radar system, comprising the steps of:

a. developing signals representative of the lines of position to said own position and to said transponder position from selected radar stations interrogating the transponder and said own position;

b. developing signals representative of the times of arrival at said own station of each of said interrogation replies from the transponder to the selected secondary surveillance radars;

c. establishing a preselected relationship between said lines of position and said times of arrival signals; and d. developing a signal representing the bearing angle to the transponder in accordance with the preselected relationship between said lines of position and times of arrival signals.

14. The passive method according to claim 13 comprising the further step of:

e. developing a signal representing the range from said own position to the transponder in accordance with a preselected relationship between said bearing angle signal and at least one of said time of arrival signals.

15. The passive method according to claim 14 wherein the transponder is carried by an aircraft and comprising the further steps of:
- f. decoding the altitude reporting signals contained in said transponder replies;
- g. comparing the decoded altitude of said transponder with the altitude of said own position; and
- h. controlling the development of the bearing angle signal in accordance with the difference between the altitude of said own position and the altitude of said transponder.

16. The passive method according to claim 14 wherein the transponder is carried by an aircraft and comprising the further steps of:
- i. decoding the identity reporting signals in said transponder replies;
- j. comparing the decoded identities of the transponder; and
- k. controlling the development of the bearing angle signal in accordance with the coincidence between the identities of the transponder.

17. The passive method according to claim 14 comprising the further steps of:
- l. displaying the distance separating the own position from the transponder; and
- m. displaying the rate of change in the distance separating the own position from the transponder.

18. The passive method according to claim 14 comprising the further step of:
- n. displaying the bearing angle to the transponder.

19. The passive method according to claim 14 comprising the further steps of:
- o. developing signals indicating the rate of change in the range between said own position and said transponder;
- p. developing command signals corresponding to the time separation between said own position and said transponder; and
- q. combining the range, range rate and bearing angle signals to control the development of the command signal in accordance with the movement by the transponder toward or away from said own position.

* * * * *